United States Patent
Piemontesi et al.

(10) Patent No.: US 12,359,046 B2
(45) Date of Patent: Jul. 15, 2025

(54) HETEROPHASIC PROPYLENE COPOLYMERS

(71) Applicant: BASELL POLIOLEFINE ITALIA S.R.L., Milan (IT)

(72) Inventors: Fabrizio Piemontesi, Ferrara (IT); Alessandro Mignogna, Ferrara (IT); Dario Liguori, Ferrara (IT); Giampiero Morini, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 679 days.

(21) Appl. No.: 17/642,277

(22) PCT Filed: Aug. 31, 2020

(86) PCT No.: PCT/EP2020/074185
§ 371 (c)(1),
(2) Date: Mar. 11, 2022

(87) PCT Pub. No.: WO2021/052737
PCT Pub. Date: Mar. 25, 2021

(65) Prior Publication Data
US 2022/0298343 A1    Sep. 22, 2022

(30) Foreign Application Priority Data
Sep. 17, 2019   (EP) .................................... 19197668

(51) Int. Cl.
C08L 23/16    (2006.01)
C08F 2/34    (2006.01)
(Continued)

(52) U.S. Cl.
CPC ............... C08L 23/12 (2013.01); C08L 23/16 (2013.01); C08F 2/001 (2013.01); C08F 2/34 (2013.01);
(Continued)

(58) Field of Classification Search
CPC ...... C08L 23/12; C08L 23/16; C08L 2207/02; C08F 210/16; C08F 2/001; C08F 2/34; C08F 4/6143; C08F 4/6145
See application file for complete search history.

(56) References Cited

U.S. PATENT DOCUMENTS

| | | |
|---|---|---|
| 4,399,054 A | 8/1983 | Ferraris et al. |
| 4,469,648 A | 9/1984 | Ferraris et al. |

(Continued)

FOREIGN PATENT DOCUMENTS

| | | |
|---|---|---|
| JP | 200212715 A | 1/2002 |
| JP | 201689130 A | 5/2016 |

(Continued)

*Primary Examiner* — Rip A Lee

(57) ABSTRACT

A polypropylene composition made from or containing:
A) from 60 to 90 wt %, based upon the total weight of the polypropylene composition, of a fraction insoluble in xylene at 25° C., is made from or containing more than 80% wt of propylene units, and
B) from 10 to 40 wt %, based upon the total weight of the polypropylene composition, of a fraction soluble in xylene at 25° C. is made from or containing a copolymer of propylene and ethylene having an average content of ethylene derived units from 30.0 wt % to 55.0 wt %, wherein the fraction when subjected to GPC fractionation and continuous IR analysis for determining the ethylene content of the eluted fractions (GPC-IR analysis), shows that the content of ethylene increases along with the Mw for fractions having Mw higher than the average.

15 Claims, 3 Drawing Sheets

GPC-IR Plot on the XS fractions of the compositions of Examples 1 (black continuous line) and 2 (dashed line) and Comparative Example C5 (grey continuous line). Along with the molecular weight distribution curves, the ethylene distribution curves as a function of Log M are shown. The relevant Mw and C2 Mw values are also evidenced in the graph.

(51) Int. Cl.
  *C08F 210/16* (2006.01)
  *C08L 23/12* (2006.01)
  *C08F 2/00* (2006.01)
  *C08F 4/614* (2006.01)
(52) U.S. Cl.
  CPC .......... *C08F 4/6143* (2013.01); *C08F 210/16* (2013.01); *C08L 2205/03* (2013.01); *C08L 2207/02* (2013.01)

(56) References Cited

U.S. PATENT DOCUMENTS

| | | | | |
|---|---|---|---|---|
| 7,291,676 | B2 * | 11/2007 | Berta | C08L 23/10 525/97 |
| 7,524,903 | B2 * | 4/2009 | Mei | C08F 10/06 526/348 |
| 8,080,616 | B2 * | 12/2011 | Pellegatti | C08L 23/0815 525/240 |
| 9,752,023 | B2 * | 9/2017 | Galvan | C08L 23/12 |
| 10,316,122 | B2 * | 6/2019 | Massari | C08F 4/6574 |
| 10,494,517 | B1 * | 12/2019 | Cathelin | C08F 110/06 |
| 2009/0118414 | A1 | 5/2009 | Kitade et al. | |
| 2010/0280166 | A1 | 11/2010 | Nenseth et al. | |
| 2012/0214947 | A1 | 8/2012 | Klimke et al. | |
| 2012/0220727 | A1 | 8/2012 | Klimke et al. | |
| 2018/0179371 | A1 | 6/2018 | Cavalieri et al. | |
| 2018/0186982 | A1 | 7/2018 | Chen et al. | |

FOREIGN PATENT DOCUMENTS

| | | |
|---|---|---|
| JP | 2020528962 A | 10/2020 |
| WO | 2014048861 A1 | 4/2014 |

* cited by examiner

GPC-IR Plot on the XS fractions of the compositions of Examples 1 (black continuous line) and 2 (dashed line) and Comparative Example C5 (grey continuous line). Along with the molecular weight distribution curves, the ethylene distribution curves as a function of Log M are shown. The relevant $\bar{M}w$ and C2 $\bar{M}w$ values are also evidenced in the graph.

GPC-IR Plot on the XS fractions of the compositions of Examples 3 (black continuous line) and Comparative Example C6 (grey continuous line). Along with the molecular weight distribution curves, the ethylene distribution curves as a function of Log M are shown. The relevant $\bar{M}w$ and C2 $\bar{M}w$ values are also evidenced in the graph.

GPC-IR Plot on the XS fractions of the compositions of Example 4 (black continuous line) and Comparative Example C7 (grey continuous line). Along with the molecular weight distribution curves, the ethylene distribution curves as a function of Log M are shown. The relevant $\bar{M}w$ and C2 $\bar{M}w$ values are also evidenced in the graph.

HETEROPHASIC PROPYLENE COPOLYMERS

This application is the U.S. National Phase of PCT International Application PCT/EP2020/074185, filed Aug. 31, 2020, claiming benefit of priority to European Patent Application No. 19197668.7, filed Sep. 17, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to heterophasic propylene copolymer compositions.

BACKGROUND OF THE INVENTION

Heterophasic propylene copolymer compositions are plastic materials employed in a variety of applications such as thin-walled packaging, housewares and automotive parts. In some instances, heterophasic propylene copolymer compositions are made from or containing a high crystalline propylene polymer fraction insoluble in xylene at 25° C., and a low crystallinity copolymer fraction being soluble in xylene at 25° C. In some instances, the high crystallinity fraction is a propylene homopolymer, or a random propylene copolymer with a low amount of olefin comonomer, characterized by high isotacticity. In some instances, the low crystallinity fraction is a propylene copolymer, having a content of ethylene ranging from 15 to 75% wt. In some instances, the propylene copolymer is a propylene-ethylene copolymer.

SUMMARY OF THE INVENTION

In a general embodiment, the present disclosure provides a polypropylene composition made from or containing:
A) from 60 to 90 wt %, based upon the total weight of the polypropylene composition, of a fraction insoluble in xylene at 25° C., wherein the fraction insoluble in xylene is made from or containing more than 80% wt of propylene units, and
B) from 10 to 40 wt %, based upon the total weight of the polypropylene composition, of a fraction soluble in xylene at 25° C., wherein the fraction soluble in xylene at 25° C. is made from or containing a copolymer of propylene and ethylene having an average content of ethylene derived units from 30.0 wt % to 55.0 wt %, wherein the fraction soluble in xylene at 25° C., when subjected to GPC fractionation and continuous IR analysis for determining the logarithm of molecular weight (Log M) and the associated ethylene content of the eluted copolymer fractions (GPC-IR analysis), provides a plot showing:
the logarithm of average molecular weight (Log $\overline{M}$w) ranging from 4.7 to 5.7 to which is associated an ethylene content $C_2$ $\overline{M}$w (expressed as % wt) and
at least an eluted copolymer fraction having logarithm of molecular weight (Log M) higher than Log $\overline{M}$w to which is associated an ethylene content higher than $C_2$ $\overline{M}$w.

DETAILED DESCRIPTION OF THE INVENTION

Figure 1:
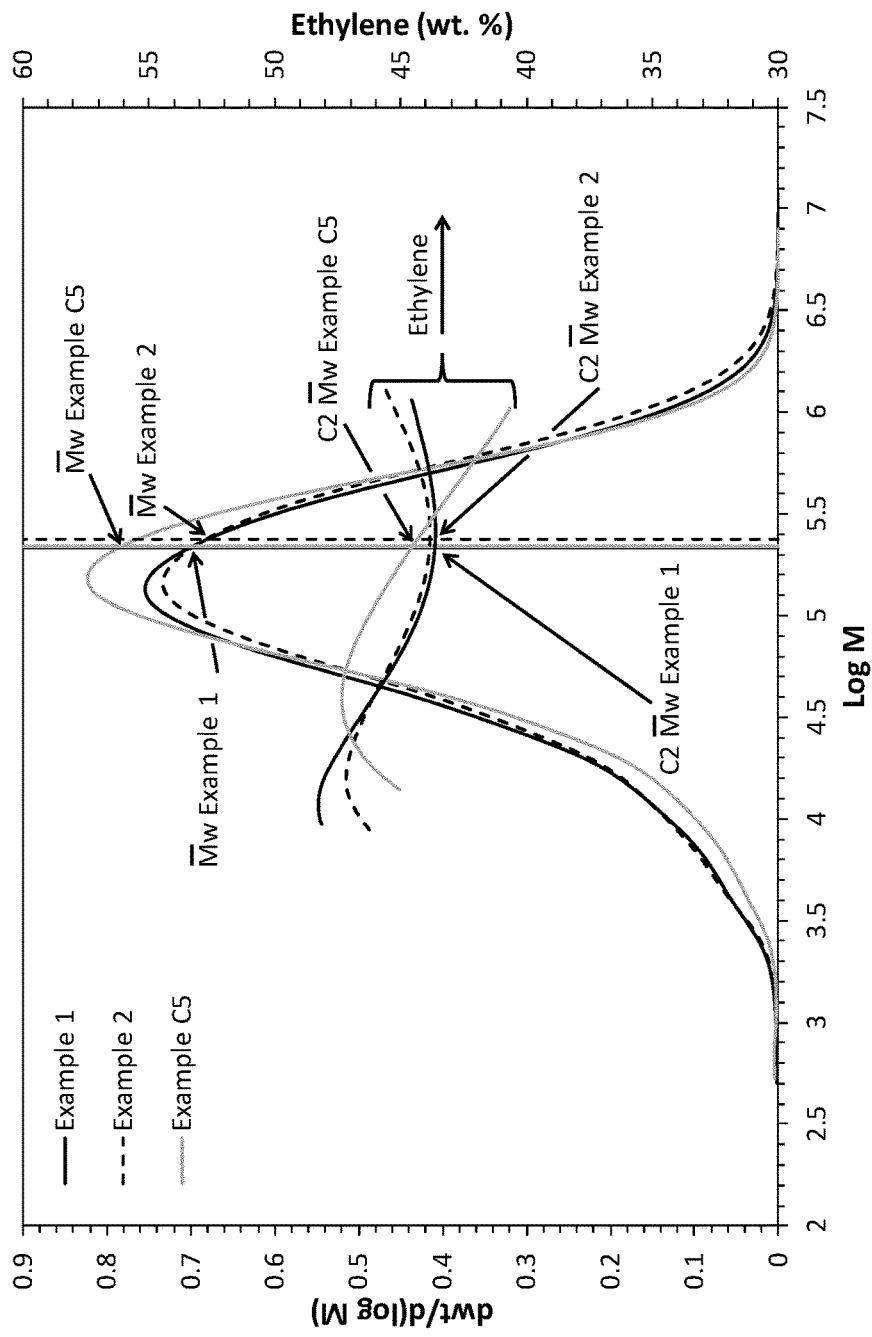
FIG. 1 shows GPC-IR plot on the XS fractions of the compositions of Examples 1 and 2 and Comparative Example C5.
Figure 2:
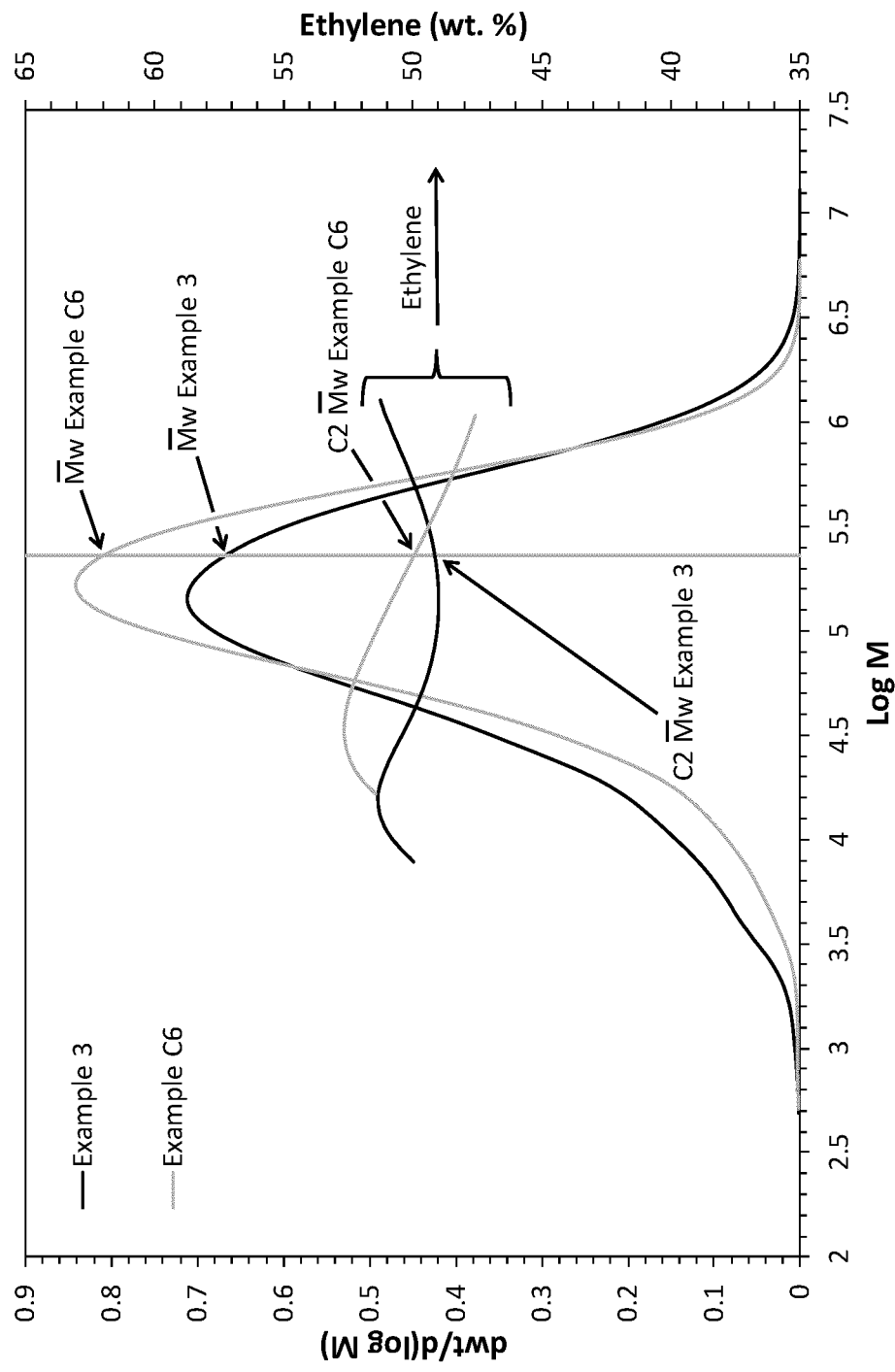
FIG. 2 shows GPC-IR plot on the XS fractions of the compositions of Examples 3 and Comparative Example C6.
Figure 3:
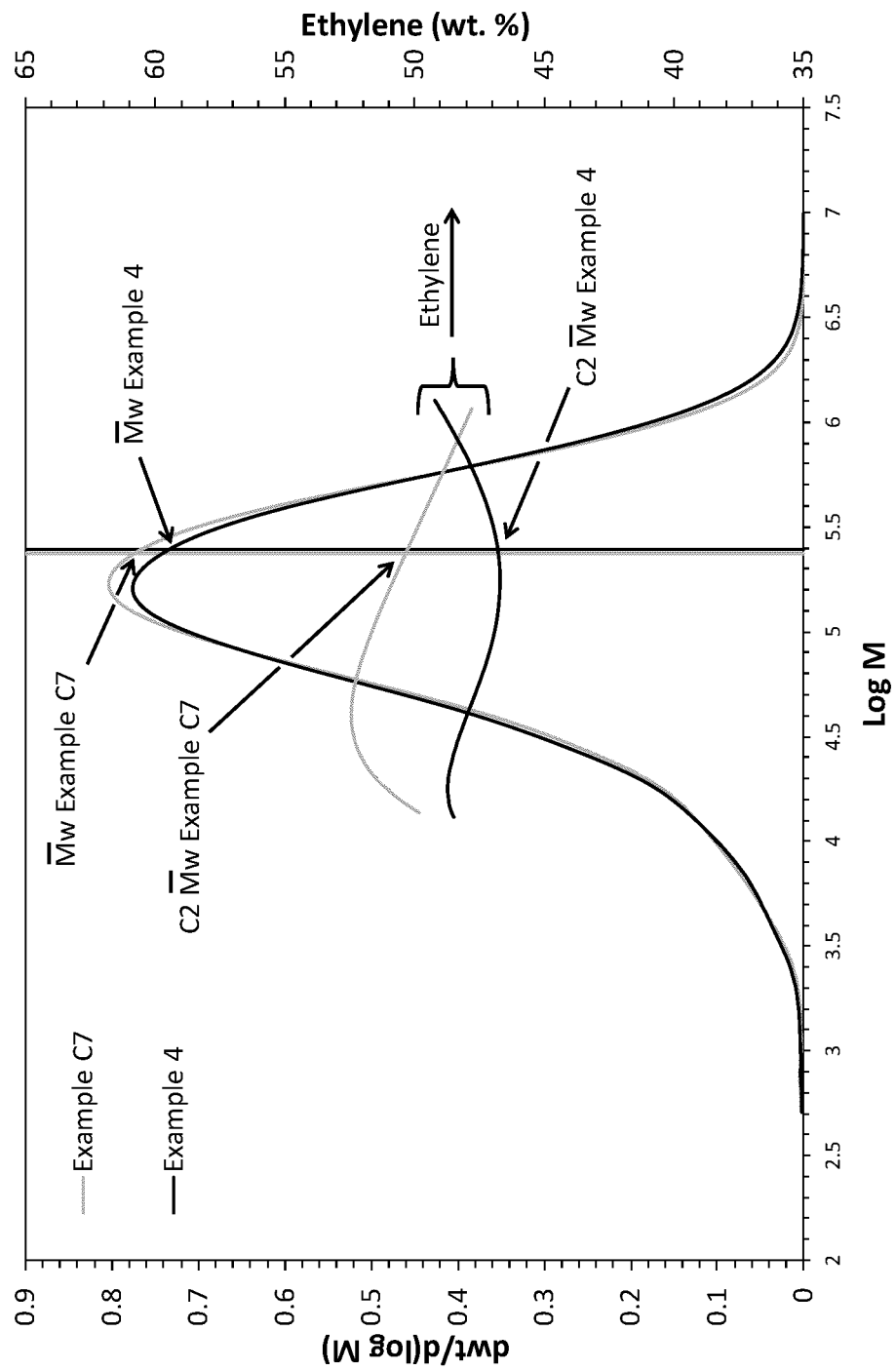
FIG. 3 shows GPC-IR plot on the XS fractions of the compositions of Example 4 and Comparative Example C7.

In some embodiments, the polypropylene composition has one or more of the following features:
(i) a MFR L (Melt Flow Rate according to ISO 1133, condition L, that is, 230° C. and 2.16 kg load) from 5.0 to 100 g/10 min, alternatively from 7 to 70 g/10 min, alternatively from 10 to 50 g/10 min.; alternatively from 5.0 to less than 20.0 g/10 min; alternatively from 20.0 to 50.0 g/10 min;
ii) an intrinsic viscosity of the fraction soluble in xylene at 25° C. between 1.2 and 4.0 dl/g, alternatively from 1.5 and 3.5 dl/g, alternatively from 1.8 to 3.0 dl/g;
iii) a xylene soluble fraction (component B) ranging from 13.0 to 37.0 wt %, alternatively from 17 to 32% wt;
iv) an average content of ethylene derived units in the component B ranging from 32.0 to 48.0 wt %, alternatively from 35 to 45% wt;
v) the logarithm of average molecular weight (Log $\overline{M}$w) of the fraction B) soluble in xylene at 25° C. ranges from 5.0 to 5.6, alternatively from 5.2 to 5.5;
vi) none of the eluted copolymer fractions, having logarithm of molecular weight (Log M) higher than Log $\overline{M}$w, has an associated ethylene content lower than $C_2$ $\overline{M}$w; alternatively the eluted copolymer fractions, having logarithm of molecular weight (Log M) higher than Log $\overline{M}$w, have an associated ethylene content higher than $C_2$ $\overline{M}$w; and
vii) the value of $C_2$ $\overline{M}$w ranges from 32 to 60% wt, alternatively from 35 to 55% wt.

As used herein, the term "copolymer" refers to polymers consisting of ethylene and propylene.

In some embodiments, the copolymer fractions of the component (B) show an "inverse" ethylene distribution within the polypropylenic chains.

In some embodiments, the polypropylene compositions show values of Charpy at 23° C. higher than 10 KJ/m² and up to 70 KJ/m². In some embodiments, values of Charpy at 23° C. in the range from higher than 25 to 70 KJ/m² are obtained when the compositions show a MFR L in the range from 5.0 to less than 20.0 g/10 min, a content of component (B) ranging from 20 to 25%, and ethylene content of component (B) ranging from 35 to 40% wt. In some embodiments, values of Charpy at 23° C. in the same range are obtained with MFR L in the range from 20.0 to 50.0, a content of component (B) from 25% to 35%, and ethylene content of component (B) ranging from 35 to 45% wt.

In some embodiments, the values of Charpy at 0° C. range from 5 to 15 KJ/mm².

In some embodiments the Flexural Modulus is between 700 and 1300 N/mm², alternatively between 850 and 1200 N/mm². In some embodiments, the compositions have values of Tensile Modulus higher than 850 N/mm² coupled with values of Charpy at 23° C. equal to or higher than 15 KJ/mm².

In some embodiments, the compositions are useful for preparing injection molding articles.

In some embodiments, the polyolefin composition is prepared by a process including the steps of polymerizing propylene alone or in mixture with a low amount of ethylene in a first stage and then, in a second stage, polymerizing propylene with a higher amount of ethylene, both stages being conducted in the presence of a catalyst made from or containing the product of the reaction between:

a) a solid catalyst component made from or containing Ti, Mg, Cl, a first electron donor compound selected from 1,3 diethers (DE) and a second electron donor compound selected from dicarbamates (DC), wherein the electron donor compounds are present in a molar ratio DE:DC ranging from 4.5:1 to 20:1;

b) an alkylaluminum compound and, c) an external electron-donor compound having the formula:

$(R_7)a(R_8)bSi(OR_9)c$, where a and b are integers from 0 to 2, c is an integer from 1 to 4 and the sum (a+b+c) is 4; $R_7$, $R_8$, and $R_9$, are alkyl, cycloalkyl or aryl radicals with 1-18 carbon atoms optionally containing heteroatoms.

In some embodiments, the DE:DC molar ratio ranges from 5:1 to 15:1, alternatively from 7:1 to 10:1.

In some embodiments, the molar ratio between total amounts of donors DE+DC and the Ti atoms (DE+DC):Ti ratio ranges from 0.3:1 to 1:1, alternatively from 0.4:1 to 1:1.

In some embodiments, the solid catalyst component has a porosity determined by mercury method relating to pore with radius equal to or less than 1 μm of at least 0.30 cm³/g. In some embodiments, the porosity is higher than 0.35 cm³/g, alternatively higher than 0.40 cm³/g.

In some embodiments, the dicarbamates have formula (I):

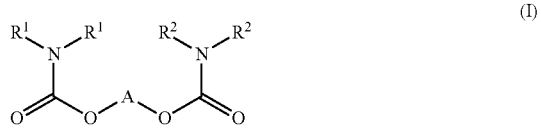

where $R^1$ and $R^2$, independently, are selected from hydrogen and $C_1$-$C_{15}$ hydrocarbon groups, optionally contain a heteroatom selected from halogen, P, S, N, O and Si, which can be fused together to form one or more cycles and A is a bivalent bridging group In some embodiments, the dicarbamate structures of formula (I) are as described in Patent Cooperation Treaty Publication No. WO2014048861, which is herein included by reference.

In some embodiments, the 1,3-diethers (DE) are the compounds of formula (II)

where $R^I$ and $R^{II}$ are the same or different and are hydrogen or linear or branched $C_1$-$C_{18}$ hydrocarbon groups; $R^{III}$ groups, equal or different from each other, are hydrogen or $C_1$-$C_{18}$ hydrocarbon groups; $R^{IV}$ groups equal or different from each other, have the same meaning of $R^{III}$ except that $R^{IV}$ groups cannot be hydrogen. In some embodiments, $R^I$ or $R^{II}$ has constituents of cyclic structures. In some embodiments, each of $R^I$ to $R^{IV}$ groups contains heteroatoms selected from halogens, N, O, S and Si.

In some embodiments, the solid catalyst component (a) further contains Bi atoms in an amount ranging 0.5 to 40%, alternatively from 1 to 35, alternatively from 2 to 25% wt, alternatively from 2 to 20% wt, with respect to the total weight of solid catalyst component (a).

In some embodiments, the particles of the solid component (a) have substantially spherical morphology and an average diameter ranging between 5 and 150 μm, alternatively from 20 to 100 μm, alternatively from 30 to 90 μm. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30%, alternatively from 10 to 25% wt, based upon the total weight of the solid catalyst component.

In some embodiments, the amount of Ti ranges from 0.5 to 7%, alternatively from 0.7 to 5% wt, based upon the total weight of the solid catalyst component.

In some embodiments, the Bi atoms derive from one or more Bi compounds not having Bi-carbon bonds. In some embodiments, the Bi compounds are selected from the group consisting of Bi halides, Bi carbonate, Bi carboxylates, Bi nitrate, Bi oxide, Bi sulfate, and Bi sulfide. In some embodiments, the Bi compounds have the valence state of 3⁺. In some embodiments, the Bi compounds are selected from the group consisting of Bi trichloride and Bi tribromide. In some embodiments, the Bi compounds are selected from the group consisting of $BiCl_3$, Bi oxide, Bi carbonate and Bi neodecanoate.

In some embodiments, the solid catalyst component is prepared by reacting a titanium compound of formula $Ti(OR)_{q-y}X_y$, where q is the valence of titanium and y is a number between 1 and q, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with a Ti compound or subjected to thermal controlled dealcoholation (80-130° C.), thereby obtaining an adduct wherein the number of moles of alcohol is of lower than 3, alternatively between 0.1 and 2.5. In some embodiments, the reaction with the Ti compound is carried out by suspending the adduct (dealcoholated or as such) in cold $TiCl_4$; the mixture is heated up to 80-130° C. and kept at this temperature for 0.5-2 hours. In some embodiments, the treatment with $TiCl_4$ is carried out one or more times. In some embodiments, the electron donor compound is added during the treatment with $TiCl_4$.

In some embodiments, the reaction with the Ti compound is carried out by suspending the adduct (dealcoholated or as such) in cold $TiCl_4$. In some embodiments, the temperature of the cold $TiCl_4$ is 0° C. In some embodiments, the adduct is used in an amount to have a concentration ranging from 20 to 100 g/l, alternatively from 30 to 90 g/l. In some embodiments, the 1,3-diether and the dicarbamate are added to the system at the beginning of this stage of reaction. In some embodiments, the 1,3-diether and the dicarbamate when the temperature of the mixture is in the range of −10° to 20° C. In some embodiments, the 1,3 diether is added first. In some embodiments, the electron donors are used in amounts with consideration for the respective efficiency in being fixed on the catalyst. In some embodiments, the Mg/diether molar ratio ranges from 3:1 to 10:1, alternatively from 4:1 to 9:1. In some embodiments, the Mg/dicarbamate molar ratio ranges from 25:1 to 200:1, alternatively from 30:1 to 180:1. The temperature is then gradually raised up until reaching a temperature ranging from 90-130° C. and kept at this temperature for 0.5-3 hours.

After completing the reaction time, stirring is stopped, the slurry is allowed to settle, and the liquid phase is removed. A second stage of treatment with $TiCl_4$ is performed. In some embodiments, the second stage of treatment is carried out at a temperature ranging from 70 to 110° C. After completing the reaction time, stirring is stopped, the slurry is allowed to settle, and the liquid phase is removed. In some embodiments, an additional reaction stage with the titanium compound is carried out. In some embodiments, an additional reaction stage with the titanium compound is carried out with $TiCl_4$ under the same conditions described above and in the absence of electron donors. In some embodiments, the resulting solid is then washed with liquid hydrocarbon under mild conditions and then dried.

In some embodiments, the alkylaluminum compound (b) is selected from the group consisting of trialkyl aluminum compounds, alkylaluminum halides, alkylaluminum hydrides and alkylaluminum sesquichlorides. In some embodiments, the alkylaluminum compound (b) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (b) is an alkylaluminum sesquichlorides selected from the group consisting of $AlEt_2Cl$ and $Al_2Et_3Cl_3$. In some embodiments, the alkylaluminum compound (b) is a mixture including trialkylaluminums. In some embodiments, the Al/Ti ratio is higher than 1, alternatively between 50 and 2000.

In some embodiments, the external electron donor compound (c) is a silicon compound having the formula $(R_7)a(R_8)bSi(OR_9)c$, where a and b are integers from 0 to 2, c is an integer from 1 to 4 and the sum (a+b+c) is 4; $R_7$, $R_8$, and $R_9$, are alkyl, cycloalkyl or aryl radicals with 1-18 carbon atoms optionally containing heteroatoms.

In some embodiments, the silicon compounds have a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, alternatively methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl) thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds have a is 0, c is 3, $R_8$ is a branched alkyl or cycloalkyl group, optionally containing heteroatoms, and $R_9$ is methyl. In some embodiments, the silicon compounds are selected from the group consisting of cyclohexyltrimethoxysilane, t-butyltrimethoxysilane and thexyltrimethoxysilane.

In some embodiments, the external electron donor compound (c) is used in an amount to give a molar ratio between the alkylaluminum compound (b) and the external electron donor compound (c) of from 0.1 to 200, alternatively from 1 to 100, alternatively from 3 to 50.

In some embodiments, the polymerization process is carried out in gas-phase, operating in one or more fluidized or mechanically agitated bed reactors, slurry polymerization using as diluent an inert hydrocarbon solvent, or bulk polymerization using the liquid monomer as a reaction medium. In some embodiments, the liquid monomer is propylene.

In some embodiments, the polypropylene composition is obtained with a sequential polymerization process in two or more stages, wherein component A) is obtained in the first stage and then component B) is obtained in the second stage in the presence of component A). In some embodiments, each stage is in gas-phase, operating in one or more fluidized or mechanically agitated bed reactors, or bulk polymerization using the liquid monomer as a reaction medium. In some embodiments, the liquid monomer is propylene. In some embodiments, hybrid processes are used, wherein in a first stage is carried out in liquid monomer and a second stage is carried out in gas-phase. In some embodiments, component (A) is prepared in the first stage. In some embodiments, component (B) is prepared in the second stage.

In some embodiments, the polymerization is carried out at temperature of from 20 to 120° C., alternatively from 40 to 80° C. In some embodiments, the polymerization is carried out in gas-phase and the operating pressure is between 0.5 and 5 MPa, alternatively between 1 and 4 MPa. In some embodiments, the polymerization is carried out in bulk polymerization and the operating pressure is between 1 and 8 MPa, alternatively between 1.5 and 5 MPa. In some embodiments, hydrogen is used as a molecular weight regulator.

In some embodiments, the heterophasic copolymer compositions is further made from or containing additives. In some embodiments, the additives are selected from the group consisting of antioxidants, light stabilizers, heat stabilizers, nucleating agents, colorants and fillers.

In some embodiments, the heterophasic copolymer composition is used in injection molding, thermoforming and extrusion processes.

The following examples are to illustrate and not limit the present disclosure.

Characterization

Determination of X.I. and X.S

About 2.5 grams of polymer and 250 ml of o-xylene were placed in a round-bottomed flask provided with a cooler and a reflux condenser and kept under nitrogen. The resulting mixture was heated to 135° C. and kept under stirring for about 60 minutes. The final solution was allowed to cool to 25° C. under continuous stirring. The insoluble polymer was then filtered. The filtrate was then evaporated in a nitrogen flow at 140° C. to reach a constant weight. The content of the xylene-soluble fraction is expressed as a percentage of the original 2.5 grams and the X.I. % is calculated by difference to 100%.

Intrinsic Viscosity (I.V.)

The sample was dissolved in tetrahydronaphthalene at 135° C. and then poured into a capillary viscometer. The viscometer tube (Ubbelohde type) was surrounded by a cylindrical glass jacket; this setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., *J. Am. Chem. Soc.*, 1942, 64, 2716), using the flow time of the pure solvent at the same experimental conditions (same viscometer and same temperature). A single polymer solution was used to determine [η].

Melt Flow Rate

The melt flow rate MFR L of the polymer was determined according to ISO 1133 (230° C., 2.16 Kg).

Flexural Modulus

Flexural Modulus was measured according to ISO 178 and ISO 1873-2.

Charpy

Charpy impact test was performed according to ISO 179-1eA, and ISO 1873-2.

$^{13}$C NMR of Propylene/Ethylene Copolymers

The $^{13}$C NMR spectra of the heterophasic copolymers and of the XI and XS fractions were acquired on a Bruker AV-600 spectrometer equipped with cryoprobe, operating at 160.91 MHz in the Fourier transform mode at 120° C.

The peak of the $S_{\beta\beta}$ carbon (nomenclature according to "Monomer Sequence Distribution in Ethylene-Propylene Rubber Measured by $^{13}$C NMR. 3. Use of Reaction Probability Mode" C. J. Carman, R. A. Harrington and C. E. Wilkes, Macromolecules, 1977, 10, 536) was used as internal reference at 29.9 ppm. The samples were dissolved in 1,1,2,2-tetrachloroethane-$d_2$ at 120° C. with an 8% wt/v concentration. Each spectrum was acquired with a 90° pulse, 15 seconds of delay between pulses and CPD to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100\ T_{\beta\beta}/S \quad PPE=100\ T_{\beta\delta}/S \quad EPE=100\ T_{\delta\delta}/S$$

$$PEP=100\ S_{\beta\beta}/S \quad PEE=100\ S_{\beta\delta}/S \quad EEE=100(0.25\ S_{\gamma\delta}+0.5\ S_{\delta\delta})/S$$

$$S=T_{\beta\beta}+T_{\beta\delta}+T_{\delta\delta}+S_{\beta\beta}+S_{\beta\delta}+0.25\ S_{\gamma\delta}+0.5\ S_{\delta\delta}$$

The molar percentage of ethylene content was evaluated using the following equation:

$$E\ \%\ mol=100\times[PEP+PEE+EEE]$$

The weight percentage of ethylene content was evaluated using the following equation:

$$E\ \%\ wt=100\times MW_E\times E\ \%\ mol/(MW_E\times E\ \%\ mol+MW_P\times P\ \%\ mol)$$

where P % mol is the molar percentage of propylene content, while $MW_E$ and $MW_P$ are the molecular weights of ethylene and propylene, respectively.

Gel Permeation Chromatography-IR

Gel Permeation Chromatography analysis was carried out on XS fraction of heterophasic copolymers with a GPC-IR apparatus (PolymerChar) at 150° C. in 1,2,4-trichlorobenzene (TCB). The solution concentrations were 1.5 mg/mL (at 150° C.). 0.3 g/L of 2,6-diterbuthyl-p-chresole was added to prevent degradation. A column set of four PLgel Olexis mixed-bed (Polymer Laboratories) and an IR5 infrared detector (PolymerChar) were used. The dimensions of the columns were 300×7.5 mm. The particle size was 13 μm. The mobile phase flow rate was kept at 1.0 mL/min. After the column fractionation, the IR5 infrared detector was used to continuously measure both the amount and the composition of polymer fraction in solution. For GPC calculation, a universal calibration curve was obtained using 12 polystyrene (PS) standard samples supplied by PolymerChar (peak molecular weights ranging from 266 to 1220000 g/mol). A third order polynomial fit was used for interpolating the experimental data to obtain the relevant calibration curve. Data acquisition and processing was done by using GPC-ONE software (provided by PolymerChar).

The Mark-Houwink relationship ($[\eta]=KM^\alpha$) was used to determine the molecular weight (M) distribution and the relevant average molecular weights, using $K_{PS}=1.21\times10^{-4}$, $\alpha=0.706$ dL/g for polystyrene. For ethylene-propylene copolymers, an averaged value $K_{COPO}$ (dependent on copolymer composition) and $\alpha=0.725$ (independently on the copolymer composition) were applied.

The $K_{COPO}$ values were calculated using a linear combination of the K values of the pure polyethylene ($K_{PE}=4.06\times10^{-4}$ dL/g) and polypropylene ($K_{PP}=1.90\times10^{-4}$ dL/g) polymers, assuming a constant sample composition in the whole range of molecular weight using the relation:

$$K_{COPO}=X_P K_{PP}+X_E K_{PE}$$

where $K_{COPO}$ is the calculated constant of the copolymer, $X_P$ and $X_E$ are the propylene and ethylene weight fractions of the copolymer ($X_P+X_E=1$).

Finally, the copolymer composition along the molecular weight distribution was measured as methyl groups per 1000 carbon atoms by the IR5 infrared detector. This value was also converted to ethylene % wt by calibrating the IR5 infrared detector with 4 samples: a polypropylene and a polyethylene homopolymer samples and two ethylene/propylene copolymer samples (having an ethylene content of 5 and 50% wt as determined with $^{13}$C-NMR). For each sample, the value of ethylene composition $C_2\ \overline{M}w$ (% wt) was determined from the distribution curve Ethylene vs. for $M=\overline{M}w$. From the combination of ethylene and MW distribution curves, an average ethylene content of XS fraction was also obtained ($C_2$% wt).

EXAMPLES

General Procedure for the Preparation of MgCl$_2$·(EtOH)m Adducts.

An initial amount of microspheroidal MgCl$_2$.2.8C$_2$H$_5$OH was prepared according to the method described in Example 2 of U.S. Pat. No. 4,399,054 but operating at 3,000 rpm instead of 10,000. The resulting adduct, having an average particle size of 60 μm, was then subjected to thermal dealcoholation at increasing temperatures from 30 to 130° C. operating in nitrogen current until the molar alcohol content per mol of Mg was 2.0.

Procedure for the Preparation of the Solid Catalyst Component

Into a 1000 mL four-necked round flask, purged with nitrogen, 500 mL of TiCl$_4$ were introduced at 0° C. While stirring, 30 grams of the microspheroidal MgCl$_2$.2.0C$_2$H$_5$OH adduct were added. Then, an amount of 9,9-bis(methoxymethyl)fluorene and, successively, an amount of 5-(tert-butyl)-3-methyl-1,2-phenylene bis(diethylcarbamate) to have a Mg/DE and Mg/DC molar ratio reported in Table 1, were charged.

The temperature was raised to 100° C. and maintained for 60 minutes. After the 60 minutes, the stirring was stopped, the liquid was siphoned off, and the treatment with TiCl$_4$ was repeated at 110° C. for 30 minutes. After that time, the stirring was stopped, the liquid was siphoned off, and the treatment with TiCl$_4$ was repeated at 110° C. for 15 min. After sedimentation and siphoning of the liquid phase, the solid was washed four times with anhydrous heptane (6×100 ml) at 90° C. and twice with hexane at room temperature. The characterization of the solid catalytic component is reported in Table 1.

TABLE 1

| Solid catalyst precursor | Catalyst Synthesis | | Catalyst characterization | | |
|---|---|---|---|---|---|
| | Mg/DC mole ratio | Mg/DE mole ratio | Ti wt % | ID total wt % | DE/DC molar |
| A | 59 | 6.7 | 4.8 | 16.9 | 8.1:1 |
| B | 60 | 6.0 | 4.7 | 18.0 | 9.5:1 |
| C (comparative) | Mg/DIBP = 10 | | 2.7 | 11.3 | — |

Examples 1-4 and Comparative Examples 5-7

A 4 liters steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, a suspension containing 75 ml of anhydrous hexane, 0.76 g of AlEt$_3$, 76 mg of dicyclopentyldimethoxysilane (D donor) and about 7-14 mg of solid catalyst component was charged. The autoclave was closed, then an amount of hydrogen was added (values reported in Table 2). Finally, 1.2 kg of liquid propylene were fed in 2 minutes under continuous stirring. The temperature was raised to 70° C. in 10-11 minutes and the polymerization was carried out at this temperature for the time reported in Table 2. At the end of this polymerization step, the non-reacted propylene was removed. During venting, the internal temperature was kept at 55-65° C. (by setting the jacket temperature at 70° C.).

The procedure for the gas phase reaction was then started. The content of the autoclave was warmed to the reported temperature (Table 2), and, simultaneously, ethylene, propylene and hydrogen were fed (amounts reported in Table 2). This step was completed in about 10 minutes. The copolymerization was conducted by feeding ethylene and propylene mixture in a wt/wt ratio equal to 50% wt to keep the pressure constant at the value measured at the end of temperature increasing (values are in Table 2). The amount of ethylene consumption is also reported in Table 2.

The polymerization was stopped when the target copolymer split (amount of copolymer produced in the second step with respect to the total heterophasic composition) was obtained. This split value was calculated using the amount of monomers fed during the gas phase polymerization (experimental) and from the amount of homopolymer made in the liquid phase polymerization (estimated from catalyst mileage, determined in a separate homopolymer run, and the amount of solid catalyst component added to the autoclave).

At the end, the monomers were vented off while the autoclave was cooled down to 30° C. After complete venting of monomers, the polymer was recovered and dried under vacuum in an oven overnight at 80° C. Characterization data of the homopolymer runs as well as of the final copolymers are reported in Table 3.

TABLE 2

| Examples | | 1 | 2 | C5 | 3 | C6 | 4 | C7 |
|---|---|---|---|---|---|---|---|---|
| Solid Catalyst precursor | | A | B | C | A | C | A | C |
| 1$^{st}$ step, Propylene homopolymer | | | | | | | | |
| Time | min | 90 | 60 | 90 | 30 | 60 | 30 | 60 |
| [H$_2$] | NL | 5.3 | 4.8 | 8.5 | 12.5 | 22.0 | 10.0 | 22.0 |
| Mileage | Kg/g | 56.2 | 61.2 | 46.9 | 33.9 | 46.9 | 63.7 | 48.0 |
| 2$^{nd}$ step, Gas-Phase C$_2$/C$_3$ copolymerization | | | | | | | | |
| Hydrogen | NL | 1.1 | 0.8 | 2.3 | 2.0 | 2.0 | 2.5 | 2.0 |
| Ethylene (initial) | g | 66 | 66 | 60 | 50 | 60 | 50 | 60 |
| Propylene (initial) | g | 95 | 106 | 105 | 115 | 105 | 115 | 105 |
| Temperature | ° C. | 80 | 80 | 80 | 70 | 80 | 70 | 80 |
| Pressure | barg | 19.4 | 19.5 | 22.5 | 22.6 | 22.9 | 23.3 | 23.1 |
| Ethylene (consumption) | g | 75 | 57 | 58 | 102 | 110 | 120 | 128 |
| Time | min | 150 | 80 | 28 | 52 | 43 | 56 | 57 |
| Mileage | Kg/g | 76.9 | 80.6 | 65.1 | 49.9 | 69.0 | 96.5 | 71.6 |
| HOMO/COPOLYMER Split | wt %/wt % | 73/27 | 76/24 | 72/28 | 68/32 | 68/32 | 66/34 | 67/33 |

TABLE 3

| Example | | 1 | 2 | C5 | 3 | C6 | 4 | C7 |
|---|---|---|---|---|---|---|---|---|
| Properties of the composition | | | | | | | | |
| MFR "L" propylene homopolymer 1st Stage | | 11.5 | 19.4 | 20.2 | 111 | 98 | 99 | 106 |
| MFR "L" whole composition | g/10' | 11.1 | 11.1 | 10.7 | 31.0 | 29.0 | 21.7 | 19.9 |
| Ethylene whole composition | % wt | 11.8 | 11.1 | 12.9 | 16.2 | 15.7 | 17.9 | 20.1 |
| Xylene soluble fraction | % wt | 21.8 | 20.2 | 22.9 | 23.9 | 23.9 | 28.0 | 28.0 |
| Ethylene of XS fraction | % wt | 41.6 | 40.9 | 41.7 | 47.7 | 46.0 | 43.7 | 48.7 |
| Ethylene of XI fraction | % wt | 4.8 | 4.5 | 6.1 | 5.9 | 6.0 | 7.7 | 8.4 |

TABLE 3-continued

| Example | | 1 | 2 | C5 | 3 | C6 | 4 | C7 |
|---|---|---|---|---|---|---|---|---|
| I.V. of XS fraction | dl/g | 2.2 | 2.2 | 2.2 | 2.41 | 2.50 | 2.58 | 2.56 |
| Log $\overline{M}w$ of XS fraction | | 5.33 | 5.37 | 5.34 | 5.36 | 5.36 | 5.39 | 5.37 |
| $C_2$ $\overline{M}w$ of XS fraction | % wt | 43.6 | 43.8 | 44.5 | 49.1 | 49.9 | 46.8 | 50.3 |
| $C_2$ of M > $\overline{M}w$ higher than $C_2$ $\overline{M}w$ | | yes | yes | no | yes | no | yes | no |
| Charpy 23° C. | KJ/m² | 45.7 | 40 | 30 | 13.1 | 9.4 | 40.4 | 15.7 |
| Flexural Modulus | MPa | 940 | 890 | 890 | 840 | 880 | 830 | 800 |

What is claimed is:

1. A polypropylene composition comprising:
   A) from 60 to 90 wt %, based upon a total weight of the polypropylene composition, of a fraction insoluble in xylene at 25° C., wherein the fraction soluble in xylene at 25° C. comprises more than 80 wt % of propylene units, and
   B) from 10 to 40 wt %, based upon the total weight of the polypropylene composition, of a fraction soluble in xylene at 25° C., wherein the fraction soluble in xylene at 25° C. comprises a copolymer of propylene and ethylene having an average content of ethylene derived units from 30.0 wt % to 55 wt %, wherein the fraction soluble in xylene at 25° C. when subjected to GPC fractionation and continuous IR analysis for determining a logarithm of molecular weight (log M) and an associated ethylene content of eluted copolymer fractions (GPC-IR analysis), provides a plot showing:
   (i) a logarithm of average molecular weight (log $\overline{M}w$) ranging from 4.7 to 5.7 to which is associated an ethylene content $C_2$ $\overline{M}w$ (expressed as wt %) and
   (ii) at least an eluted copolymer fraction having logarithm of molecular weight (log M) higher than log $\overline{M}w$ to which is associated an ethylene content higher than $C_2$ $\overline{M}w$.

2. The polypropylene composition according to claim 1, wherein component B) ranges from 13 to 37 wt %.

3. The polypropylene composition according to claim 2, wherein component B) ranges from 17 to 32 wt %.

4. The polypropylene composition according to claim 1, wherein component B) contains from 32.0 to 48 wt % of ethylene derived units.

5. The polypropylene composition according to claim 1, wherein the polypropylene composition has a MFR L (Melt Flow Rate according to ISO 1133, condition L, 230° C. and 2.16 kg load) ranges from 5 to 100 g/10 min.

6. The polypropylene composition according to claim 5, wherein the MFR L ranges from 7 to 70 g/10 min.

7. The polypropylene composition according to claim 1, wherein an intrinsic viscosity of the fraction soluble in xylene at 25° C. ranges from 1.2 to 4.0 dl/g.

8. The polypropylene composition according to claim 7, wherein the intrinsic viscosity of the fraction soluble in xylene at 25° C. ranges from 1.5 to 3.5 dl/g.

9. The polypropylene composition according to claim 8, wherein the logarithm of average molecular weight (log $\overline{M}w$) of the fraction soluble in xylene at 25° C. ranges from 5 to 5.6.

10. The polypropylene composition according to claim 8, wherein the intrinsic viscosity of the fraction soluble in xylene at 25° C. ranges from 1.8 to 3.0 dl/g.

11. The polypropylene composition according to claim 10, wherein the logarithm of average molecular weight (log $\overline{M}w$) of the fraction soluble in xylene at 25° C. ranges from 5.2 to 5.5.

12. The polypropylene composition according to claim 1, wherein the polypropylene composition has a Charpy impact strength at 23° C. is higher than 10 kJ/m² and less than or equal to 70 kJ/m².

13. The polypropylene composition according to claim 5, wherein the polypropylene composition has a Charpy impact strength at 23° C. ranges from 25 to 70 kJ/m², the MFR L ranges from 5.0 to less than 20.0 g/10 min g/10 min, an amount of fraction (B) ranges from 25 to 35% and an average content of ethylene derived units ranges from 35 to 45 wt %.

14. The polypropylene composition according to claim 6, wherein the the polypropylene composition has a Charpy impact strength at 23° C. ranges from 25 to 70 KJ/m², the MFR L ranges from 20.0 to 50.0 g/10 min, an amount of fraction (B) ranges from 20 to 25% and an average content of ethylene derived units ranges from 35 to 40 wt %.

15. The polypropylene composition according to claim 1, wherein none of the eluted copolymer fractions, having logarithm of molecular weight (log M) higher than log $\overline{M}w$, has an associated ethylene content lower than $C_2$ $\overline{M}w$.

* * * * *